United States Patent [19]

Kukkala

[11] Patent Number: 5,939,505
[45] Date of Patent: Aug. 17, 1999

[54] HIGH SOLIDS ETHYLENE VINYL ACETATE EMULSIONS

[75] Inventor: Pravin Kukkala, Raritan, N.J.

[73] Assignee: National Starch and Chemical Investment Holding Corporation, Wilmington, Del.

[21] Appl. No.: 08/991,355

[22] Filed: Dec. 16, 1997

[51] Int. Cl.$^6$ .................................................. C08F 2/00
[52] U.S. Cl. ..................... 526/202; 526/261; 526/273; 526/319; 526/321; 526/336; 526/348
[58] Field of Search ...................... 526/202, 261, 526/273, 319, 321, 336, 348

[56] References Cited

U.S. PATENT DOCUMENTS

| | | | |
|---|---|---|---|
| 3,661,696 | 5/1972 | Knutson | 161/204 |
| 3,734,819 | 5/1973 | Knutson | 161/254 |
| 3,827,996 | 8/1974 | Beresniewicz . | |
| 4,449,978 | 5/1984 | Iacoviello . | |
| 4,921,898 | 5/1990 | Lenney et al. . | |
| 5,070,134 | 12/1991 | Oyamada et al. . | |
| 5,110,856 | 5/1992 | Oyamada et al. . | |
| 5,124,394 | 6/1992 | Lenney . | |
| 5,629,370 | 5/1997 | Freidzon | 526/202 |
| 5,633,334 | 5/1997 | Walker et al. | 526/202 |

FOREIGN PATENT DOCUMENTS

| | | | |
|---|---|---|---|
| 0 279 384 B1 | 12/1988 | European Pat. Off. | C08F 218/08 |
| 0 389 893 A2 | 3/1990 | European Pat. Off. | C08F 218/08 |
| 06322031 | 11/1994 | Japan | C08F 210/02 |

OTHER PUBLICATIONS

Article entitled "Ultra High Solids Copolymer Emulsion For Demanding Applications", by Mary Hausman, David Horwat, William Lenney; Adhesives Age; Oct., 1995; p. 49.
CA Selects: Colloids (Macromolecular Aspects), Issue 16, 1996, p. 11, Reference 125:60004p, Preparation of high-solids acrylate and/or vinyl acetate copolymer dispersion in the presence of a latex and its use in sealants, WO 96 11,234.
CA Selects: Synthetic High Polymers, Issue 13, 1995, p. 22, Reference 122:315373r, Manufacture of high-solids ethylene-vinyl ester copolymer aqueous emulsions without raising viscosity, JP 06,322,031.

*Primary Examiner*—Bernard Lipman
*Assistant Examiner*—N. Sarofim
*Attorney, Agent, or Firm*—Ellen T. Dec

[57] ABSTRACT

In a process for the polymerization of aqueous ethylene vinyl acetate emulsions wherein the polymerization is carried out in the presence of a stabilizing system comprising polyvinyl alcohol and a surfactant, the improvement which comprises using a stabilizing system consisting essentially of 2 to 8% polyvinyl alcohol and 0.25 to 4% of at least one surface-active compound comprising the addition products of 50 to 70 moles of ethylene oxide adducted to straight-chained or branch-chained alkanols or alkylphenols containing 6 to 22 carbon atoms in the alkyl group and having an HLB value equal to or greater than 18.0, the amounts being based on total vinyl acetate.

9 Claims, No Drawings

HIGH SOLIDS ETHYLENE VINYL ACETATE EMULSIONS

BACKGROUND OF THE INVENTION

Aqueous dispersions containing vinyl ester polymers are well known and are especially useful in the adhesive industry. For such uses, it is common to polymerize the monomer in an aqueous medium containing polymerization initiators and water soluble colloids. The most commonly used colloid is polyvinyl alcohol which has been hydrolyzed to a level of about 88%, i.e., which contains about 12% vinyl acetate. The resulting emulsion polymer is then formulated with either partially or fully hydrolyzed polyvinyl alcohol to obtain adhesive compositions having varying properties.

In recent years, there has emerged an increasing need for higher solids emulsions which will provide faster setting times for use on high speed production equipment. These high solids adhesive bases also find use as replacements for conventional hot melt (100% solids) material which require elevated temperatures with consequent expenditures of considerable energy. In addition to the need for high solids emulsions for such applications, it is also essential that the emulsion remain sufficiently low in viscosity that they can be applied using conventional equipment. Typically desirable coating viscosities are in the range of 800–5000 cps at 25° C.

Various methods have been described for the preparation of vinyl acetate based emulsions at solids levels of about 60%–65%. These methods are described for example in U.S. Pat. Nos. 4,921,898, 5,070,134, 5,629,370 and EP389893.

It is an object of the present invention to provide a process for the production of vinyl acetate based homo and copolymer emulsions at high solids levels, i.e., in excess of 65% and preferably greater than 70% solids while maintaining relatively low coating viscosities in the range of 800 to 5000 cps at 25° C.

SUMMARY OF THE INVENTION

We have now found that ethylene-vinyl ester based emulsion polymers, and particularly high solids emulsion polymers, may be prepared in the presence of a specific stabilizing system consisting essentially of 2 to 8% polyvinyl alcohol and 0.25 to 4% (actives) (% based on hundred vinyl acetate) of a surface-active compound comprising the reaction products of 50 to 70 moles ethylene oxide adducted to straight-chain or branched chain alkanols or alkylphenols containing 6 to 22 carbon atoms in the alkyl groups and having an HLB value equal to or greater than 18.0. The resultant emulsion polymers may be produced at solids levels up to and exceeding 65% while maintaining coating viscosities at ranges less than about 4000 cps at 25° C.

DETAILED DESCRIPTION OF THE PREFERRED EMBODIMENTS

The specific stabilizing system described herein may be used in the production of any vinyl ester ethylene based emulsion binders. While vinyl acetate is the most readily available vinyl ester used, other $C_1$–$C_{13}$ esters may also be used in amounts of 70 to 95% by weight of the copolymer. The ethylene component is generally present in levels of 5 to 30%, preferably 5 to 15% by weight.

Optionally, functional comonomers such as triallyl cyanurate, triallyl isocyanurate, diallyl maleate, diallyl fumarate, allyl glycidyl ether, divinyl benzene and diallyl phthalate may also be used at levels of 0.05 to 0.5% by weight.

It may also be desirable to incorporate in the emulsion copolymer 0.5 to 5% of a carboxyl or amide functionality. Examples of suitable ethylenically unsaturated mono- or di-carboxylic acid or half ester acids include the monocarboxylic ethylenically unsaturated acids such as acrylic, vinyl acetic, crotonic, methacrylic, tiglic, etc.; the dicarboxylic ethylenically unsaturated acids such as maleic, fumaric, itaconic, maleic, citraconic, hydromuconic, allylmolonic, etc., as well as the half esters of these dicarboxylic acids such as mono(2-ethylhexyl)maleate, monoethyl maleate, monobutyl maleate, etc.

Useful amides are the amides of a, b-olefinically unsaturated carboxylic acids such as acrylamide methacrylamide, and diacetone acrylamide; N-alkylol amides of a, b-olefinically unsaturated carboxylic acids such as N-methylol acrylamide and N-methylol methacrylamide; N-alkoxyalkyl amines of a, b-olefinically unsaturated carboxylic acids such as N-methoxymethyl acrylamide and N-butoxymethyl methacrylamide.

Alternatively, the stabilizing system may be used to prepare vinyl ester, ethylene, acrylate terpolymers in which case alkyl acrylates containing 2 to 8 carbon atoms in the alkyl group may be used in amounts of about 15 to 60% by weight, preferably 25 to 40%. Suitable acrylates include butyl, hexyl, 2-ethyl hexyl and octyl acrylates as well as the corresponding methacrylates and mixtures thereof.

The emulsion is polymerized using conventional batch or semi-batch, emulsion polymerization procedures in an aqueous medium using a free-radical catalyst and a surfactant, the pH of the aqueous system being maintained by a suitable buffering agent, if necessary, and at pressures of 10 to 130 atmospheres as taught, for example, in U.S. Pat. Nos. 3,708,388; 3,404,112 and 3,716,504. The ethylene content of the polymer depends on the ethylene content of the aqueous polymerization medium. Factors which control the ethylene content of the polymerization medium include the partial pressure of ethylene in the vapor phase over the medium and the temperature at which the polymerization is performed. Typically temperatures of 120° to 175° F., and ethylene partial pressures of 50 to 1,500, preferably from 240 to 1,000 psig, are sufficient to incorporate from 1 to 30, preferably from 5 to 15, weight percent ethylene in the polymer. Preferably the ethylene partial pressure is maintained constant throughout the polymerization period so that this monomer is continuously supplied at a constant rate.

As a protective colloid in preparation of the emulsions, polyvinyl alcohol (i.e., partially hydrolyzed polyvinyl acetate) is preferred and is used in amounts of 2 to 8%, preferably, 2 to 5% by weight. Generally, the degree of hydrolysis will vary from 50 to 98 percent, preferably from 80 to 98 percent of the acetate groups. The polyvinyl alcohol should also exhibit a viscosity of about 2 to 45 cps., preferably 3 to 30 cps for a 4 weight percent aqueous solution at 20° C. as determined by the Hoeppler falling ball method. Exemplary of the polyvinyl alcohol component include AIRVOL A203, a low molecular weight, 87 to 89 percent hydrolyzed polyvinyl acetate, and AIRVOL A205, an intermediate molecular weight, 87 to 89 percent hydrolyzed polyvinyl acetate, which are marketed by Air Products Corporation. Blends of various alcohols may also be used in order to better control the particle size distribution of the seed emulsion. The molecular weights and consequent viscosity grades of the various polyvinyl alcohols used in the blend are not particularly critical and can be used to control the final emulsion viscosity. However, it has been observed that most preferred results are obtained by the use of a substantial portion of the low molecular weight (low viscosity grade) 88% hydrolyzed polyvinyl alcohol. By low molecular weight it is meant that the polyvinyl alcohol has a degree of polymerization ranging from 100 to 800, preferably 200 to 600, and most preferably 450 to 600. Additionally, it may also be desirable to incorporate into the stabilizing system a portion, i.e. 0.25 to 3% of an even lower molecular weight grade of polyvinyl alcohol such as that available from Air Products under the tradename AIRVOL 203. As noted above, the total level of the protective colloid used will generally range from about 2 to 8 by weight, preferably 2 to 5% by weight, based on the weight of the vinyl acetate.

In addition to the polyvinyl alcohol, it is also necessary to utilize a non-ionionic emulsifier or surface-active compound comprising the addition products of 50 to 70 moles of ethylene oxide adducted to straight-chained or branch-chained alkanols or alkylphenols containing 6 to 22 carbon atoms in the alkyl group and having an HLB value equal to or greater than 18.0. Blends of these alkanols and alkyl phenols may also be utilized herein. Most preferred are the alkylphenols containing 8 and 9 carbon atoms as well as mixtures thereof. These emulsifiers are used in amounts of 0.25 to 4% (actives) by weight of the vinyl acetate.

In addition to the specific ethoxylated surfactant described above, there may also be present in the polymerization minor amounts (i.e. 0.1–1% by weight) of additional non-ionic surfactants such as polyethylene glycol esters, e.g. monolaurate, as well as the copolymers of propylene oxide with ethylene oxides and mixtures thereof.

The polymerization is typically initiated by a free radical initiator such as water soluble peracid or salt thereof, e.g., hydrogen peroxide, peracetc acid, persulfuric acid or the ammonium and alkali metal salts thereof, e.g., ammonium persulfate, sodium peracetate, lithium persulfate, potassium persulfate, sodium persulfate, etc. Alternatively, organic peroxides such as benzoyl peroxide, t-butyl hydroperoxide, etc., may also be employed. A suitable concentration of the initiator is from 0.05 to 5.0 weight percent and preferably from 0.1 to 3 weight percent.

The free radical initiator can be used alone and thermally decomposed to release the free radical initiating species or can be used in combination with a suitable reducing agent in a redox couple. The reducing agent is typically an oxidizable sulfur compound such as an alkali metal metabisulfite and pyrosulfite, e.g., sodium metabisulfite, sodium formaldehyde sulfoxylate, potassium metabisulfite, sodium pyrosulfite, or other reducing agent such as ascorbic acid, etc. The amount of reducing agent that can be employed throughout the copolymerization generally varies from about 0.1 to 3 weight percent of the amount of polymer. In the case of polymers containing functional comonomers, the comonomers are added gradually as is the initiator, either in an aqueous solution or, if not water soluble, dissolved in a small amount of vinyl acetate.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, methylene chloride and trichloroethylene, can also be added in some cases.

The protective colloid and emulsifier stabilizing system can be added in its entirety to the initial charge to the polymerization zone or a portion of the emulsifier, e.g., from 25 to 90 percent thereof, can be added continuously or intermittently during polymerization.

The polymerization reaction is generally continued until the residual monomer content is below about 1%. The completed reaction product is then allowed to cool to about room temperature while sealed from the atmosphere. It is then de-gassed of ethylene and finished with additional redox to achieve the desired low residual vinyl ester levels.

The emulsions are produced at relatively high solids contents, e.g., between 35 to in excess of about 65%, and may be diluted with water if desired for use.

In the Examples which follow, all parts are by weight and all temperatures in degrees Celsius unless otherwise noted.

EXAMPLE 1

This example illustrates the semi-batch polymerization process used in preparing the High Solids Adhesive Latexes of the present invention.

To a 10 liter autoclave was charged 120 g (of a 25% w/w solution in water) of low viscosity, 88% hydrolyzed polyvinyl alcohol (Airvol 205), 180 g (of a 25% w/w solution in water) of ultra low viscosity (Airvol 203), 88% hydrolyzed polyvinyl alcohol, 200 g (of a 10% w/w solution in water) of low viscosity, 98% hydrolyzed polyvinyl alcohol (Airvol 107), 57 g (of a 70% w/w solution in water) Triton X 705 from Union Carbide, (a C8 alkyl aryl polyethylene oxide containing 70 moles ethylene oxide), 57 g (of a 70% w/w solution in water) T-DETN-707 from Harcros Chemicals Corp. (a C9 alkyl aryl polyethylene oxide containing 50 moles ethylene oxide), 8.5 g (of a 1% w/w solution in water) ferrous sulfate solution, 2 g sodium formaldehyde sulfoxylate, 0.7 g of Sodium bicarbonate and 1425 g of water. The pH, if necessary, can be adjusted to 5.0 with dilute phosphoric acid.

After purging with nitrogen, 4000 g of vinyl acetate was charged to the reactor. The reactor was then pressurized to 600 psi with ethylene and equilibrated at 50° C. for 15 minutes. The polymerization was then initiated by metering in a solution of 15 g of tertiary butyl hydroperoxide (t-BHP) in 275 g of water and 10 g of ascorbic acid in 275 g of water over 3.5 hours.

On obtaining a two degree exotherm, the reaction temperature was then allowed to rise to 80° C. over 1 hour and maintained at this temperature during the polymerization by means of external cooling or heating. At the end of the initiator slow additions, the product was transferred to an evacuated vessel (30 L) to remove residual ethylene from the system. Twenty grams of the oxidizing agent solution (t-butyl hydroperoxide solution) was added followed by the addition of 20 g of the reducing agent solution (ascorbic acid solution).

In the above example, the process produced a latex of 67.2% solids, a viscosity of 1200 cps, pH of 4.1, and a $T_g$ of 0.3° C.

EXAMPLE 2

To a 10 liter autoclave was charged 160 g (of a 25% w/w solution in water) of low viscosity, 88% hydrolyzed polyvinyl alcohol (Airvol 205), 240 g (of a 25% w/w solution in water) of ultra low viscosity (Airvol 203), 57 g (of a 70% w/w solution in water) Triton X 705 alkyl aryl polyethylene oxide containing 70 moles ethylene oxide, 57 g (of a 70% w/w solution in water) T-DETN-707 alkyl aryl polyethylene oxide containing 50 moles ethylene oxide, 8.5 g (of a 1% w/w solution in water) ferrous sulfate solution, 2 g sodium formaldehyde sulfoxylate, 0.7 g of Sodium bicarbonate and 1425 g of water. The pH, if necessary, can be adjusted to 5.0 with dilute phosphoric acid.

After purging with nitrogen, 4000 g of vinyl acetate was charged to the reactor. The reactor was then pressurized to 600 psi with ethylene and equilibrated at 50° C. for 15 minutes. The polymerization was then initiated by metering in a solution of 15 g of tertiary butyl hydroperoxide (t-BHP) in 275 g of water and 10 g of ascorbic acid in 275 g of water over 3.5 hours.

On obtaining a two degree exotherm, the reaction temperature was then allowed to rise to 80° C. over 1 hour and maintained at this temperature during the polymerization by means of external cooling or heating. At the end of the initiator slow additions, the product was transferred to an evacuated vessel (30 L) to remove residual ethylene from the system. Twenty grams of the oxidizing agent solution (t-butyl hydroperoxide solution) was added followed by the addition of 20 g of the reducing agent solution (ascorbic acid solution).

In the above example, the process produced a latex of 68.5% solids, a viscosity of 1120 cps @ 65.4% solids, pH of 4.2, and a $T_g$ of −1.1° C.

EXAMPLE 3

This example illustrates the semi-batch polymerization process used in preparing the High Solids Adhesive Latexes of the present invention.

To a 10 liter autoclave was charged 160 g (of a 25% w/w solution in water) of low viscosity, 88% hydrolyzed polyvinyl alcohol (Airvol 205), 240 g (of a 25% w/w solution in water) of ultra low viscosity (Airvol 203), 88% hydrolyzed polyvinyl alcohol, 200 g (of a 10% w/w solution in water) of low viscosity, 98% hydrolyzed polyvinyl alcohol (Airvol 107), 57 g (of a 70% w/w solution in water) Triton X 705 alkyl aryl polyethylene oxide containing 70 moles ethylene oxide, 57 g (of a 70% w/w solution in water) T-DETN-707 alkyl aryl polyethylene oxide containing 50 moles ethylene oxide, 8.5 g (of a 1% w/w solution in water) ferrous sulfate solution, 2 g sodium formaldehyde sulfoxylate, 0.7 g of Sodium bicarbonate and 1425 g of water. The pH, if necessary, can be adjusted to 5.0 with dilute phosphoric acid.

After purging with nitrogen, 4000 g of vinyl acetate was charged to the reactor. The reactor was then pressurized to 600 psi with ethylene and equilibrated at 50° C. for 15 minutes. The polymerization was then initiated by metering in a solution of 15 g of tertiary butyl hydroperoxide (t-BHP) in 275 g of water and 10 g of ascorbic acid in 275 g of water over 3.5 hours.

On obtaining a two degree exotherm, the reaction temperature was then allowed to rise to 80° C. over 1 hour and maintained at this temperature during the polymerization by means of external cooling or heating. At the end of the initiator slow additions, the product was transferred to an evacuated vessel (30 L) to remove residual ethylene from the system. Twenty grams of the oxidizing agent solution (t-butyl hydroperoxide solution) was added followed by the addition of 20 g of the reducing agent solution (ascorbic acid solution).

In the above example, the process produced a latex of 66% solids, a viscosity of 3270 cps, pH of 3.9, grit of 0.007% and a $T_g$ of −3.6° C.

EXAMPLE 4

This example illustrates the effect of incorporating surfactant mixtures of polyethylene glycol esters along with the ethoxylated alkylphenol adducts in Example 3.

To a 10 liter autoclave was charged 120 g (of a 25% w/w solution in water) of low viscosity, 88% hydrolyzed polyvinyl alcohol (Airvol 205), 180 g (of a 25% w/w solution in water) of ultra low viscosity (Airvol 203), 88% hydrolyzed polyvinyl alcohol, 200 g (of a 10% w/w solution in water) of low viscosity, 98% hydrolyzed polyvinyl alcohol (Airvol 107), 57 g (of a 70% w/w solution in water) Triton X 705 alkyl aryl polyethylene oxide containing 70 moles ethylene oxide, 57 g (of a 70% w/w solution in water) T-DETN-707 alkyl aryl polyethylene oxide containing 50 moles ethylene oxide, 20 g of Polyethylene glycol 600 monolaurate (Stephan's Kessco PEG 600 Monolaurate), 8.5 g (of a 1% w/w solution in water) ferrous sulfate solution, 2 g sodium formaldehyde sulfoxylate, 0.7 g of Sodium bicarbonate and 1425 g of water. The pH, if necessary, can be adjusted to 5.0 with dilute phosphoric acid.

After purging with nitrogen, 4000 g of vinyl acetate was charged to the reactor. The reactor was then pressurized to 600 psi with ethylene and equilibrated at 50° C. for 15 minutes. The polymerization was then initiated by metering in a solution of 15 g of tertiary butyl hydroperoxide (t-BHP) in 275 g of water and 10 g of ascorbic acid in 275 g of water over 3.5 hours.

On obtaining a two degree exotherm, the reaction temperature was then allowed to rise to 80° C. over 1 hour and maintained at this temperature during the polymerization by means of external cooling or heating. At the end of the initiator slow additions, the product was transferred to an evacuated vessel (30 L) to remove residual ethylene from the system. Twenty grams of the oxidizing agent solution (t-butyl hydroperoxide solution) was added followed by the addition of 20 g of the reducing agent solution (ascorbic acid solution).

In the above example, the process produced a latex of 67.9% solids, a viscosity of 1670 cps, pH of 4.25, a grit of 0.002%. Comparing with Example 3, incorporation of the polyethylene glycol esters further reduces the viscosity at higher solids.

We claim:

1. In a process for the polymerization of aqueous ethylene vinyl acetate emulsions wherein the polymerization is carried out in the presence of a stabilizing system consisting essentially of 88% hydrolyzed polyvinyl alcohol and a surfactant, the improvement which comprises using a stabilizing system consisting essentially of 2 to 8% of the 88% hydrolyzed polyvinyl alcohol and 0.25 to 4% of at least one surface-active compound comprising the addition products of 50 to 70 moles of ethylene oxide adducted to straight-chained or branch-chained alkanols or alkylphenols containing 6 to 22 carbon atoms in the alkyl group and having an HLB value equal to or greater than 18.0, the amounts being based on total vinyl acetate.

2. The process of claim 1 wherein the vinyl acetate is present in the emulsion in an amount of 70 to 95% by weight of the total emulsion.

3. The process of claim 1 wherein there is additionally present 0.05 to 0.5% by weight of a functional monomer selected from the group consisting of triallyl cyanurate, triallyl isocyanurate, diallyl maleate, diallyl fumarate, gilyl glycidyl ether, divinyl benzene and diallyl phthalate.

4. The process of claim 1 wherein there is additionally present 0.05 to 5% of a monomer containing carboxyl or amide functionality.

5. The process of claim 1 wherein there is additionally present 15 to 60% by weight of an alkyl acrylate containing 2 to 8 carbon atoms in the alkyl group.

6. The process of claim 1 wherein at least a portion of the polyvinyl alcohol comprises low molecular weight 88% hydrolyzed polyvinyl alcohol.

7. The process of claim 1 wherein the polyvinyl alcohol is present in an amount of 2 to 5% by weight.

8. The process of claim 1 wherein the surface active agent contains 8 or 9 carbon atoms in the alkyl group.

9. The process of claim 1 wherein there is also present 0.1 to 1% by weight of a nonionic surfactant comprising a polyethylene glycol ester.

* * * * *